(12) United States Patent
Elliott et al.

(10) Patent No.: US 7,516,352 B2
(45) Date of Patent: Apr. 7, 2009

(54) ISOLATING A DRIVE FROM DISK ARRAY FOR DIAGNOSTIC OPERATIONS

(75) Inventors: John C. Elliott, Tucson, AZ (US); Robert A. Kubo, Tucson, AZ (US); Gregg S. Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 437 days.

(21) Appl. No.: 11/385,388

(22) Filed: Mar. 21, 2006

(65) Prior Publication Data

US 2007/0226537 A1 Sep. 27, 2007

(51) Int. Cl.
*G06F 11/00* (2006.01)
(52) U.S. Cl. ..................... 714/3; 714/5; 714/8
(58) Field of Classification Search .............. 714/3, 714/5, 8
See application file for complete search history.

(56) References Cited

U.S. PATENT DOCUMENTS

| 5,285,451 | A | 2/1994 | Henson et al. |
| 5,699,510 | A | 12/1997 | Peterson |
| 5,975,738 | A | 11/1999 | DeKoning |
| 6,654,831 | B1 | 11/2003 | Otterness |
| 6,678,839 | B2 * | 1/2004 | Mori ........................... 714/44 |
| 6,751,136 | B2 | 6/2004 | Hetrick et al. |
| 6,766,466 | B1 * | 7/2004 | Jibbe .............................. 714/4 |
| 6,813,112 | B2 | 11/2004 | Chliwnyj |
| 6,826,778 | B2 | 11/2004 | Bopardikar |
| 7,047,450 | B2 * | 5/2006 | Iwamitsu et al. .............. 714/43 |
| 7,222,259 | B2 * | 5/2007 | Tanaka et al. ................... 714/7 |
| 2002/0191537 | A1 * | 12/2002 | Suenaga ..................... 370/221 |
| 2003/0191992 | A1 * | 10/2003 | Kaminsky et al. ........... 714/712 |
| 2005/0010843 | A1 | 1/2005 | Iwamitsu et al. |
| 2005/0228943 | A1 * | 10/2005 | DeCenzo et al. ............. 711/114 |

FOREIGN PATENT DOCUMENTS

| JP | 200237427 | 12/2002 |
| JP | 2004199551 | 9/2004 |

OTHER PUBLICATIONS

American National Standards Institute, SCSI Enclosure Services (SES) Command Set, American National Standards Institute, Revision 8b, Jan. 16, 1998, p. 1.*

* cited by examiner

*Primary Examiner*—Scott T. Baderman
*Assistant Examiner*—Paul F. Contino
(74) *Attorney, Agent, or Firm*—Dan Shifrin

(57) ABSTRACT

A storage system includes a RAID adapter, disk array switches, sub-processors, and hard disk drives (HDDs). The system permits the isolation of a suspected faulty HDD to allow diagnostics to be performed without impacting operation of the rest of the system. Upon detection of a possible fault in a target HDD, a private zone is established including the target HDD and one of the sub-processors, thereby isolating the target HDD. The sub-processor performs diagnostic operations, then transmits its results to the adapter. A faulty HDD can then be fully isolated and the private zone is disassembled, allowing the sub-processor to rejoin the network.

19 Claims, 3 Drawing Sheets

ISOLATING A DRIVE FROM DISK ARRAY FOR DIAGNOSTIC OPERATIONS

RELATED APPLICATION DATA

The present application is related to commonly-assigned and co-pending U.S. application Ser. No. 11/386,066, entitled ENCLOSURE-BASED RAID PARITY ASSIST, and Ser. No. 11/386,025, entitled OFFLOADING DISK-RELATED TASKS FROM RAID ADAPTER TO DISTRIBUTED SERVICE PROCESSORS IN SWITCHED DRIVE CONNECTION NETWORK ENCLOSURE filed on the filing date hereof, which applications are incorporated herein by reference in their entireties.

TECHNICAL FIELD

The present invention relates generally to RAID storage systems and, in particular, to isolating and diagnosing a target drive with minimal impact on the balance of the system.

BACKGROUND ART

Many computer-related systems now include redundant components for high reliability and availability. Nonetheless, the failure or impending failure of a component may still affect the performance of other components or of the system as a whole. For example, in a RAID storage system, an enclosure includes an array of hard disk drives (HDDs) which are each coupled through independent ports to both of a pair of redundant disk array switches. One of a pair of redundant sub-processors is coupled to one of the switches while the other of the pair is coupled to the other switch. Alternatively, a single sub-processor is coupled to both switches and logically partitioned into two images, each logically coupled to one of the switches. Each switch is also coupled through a fabric or network to both of a pair of redundant RAID adapters external to the enclosure. The system may include additional enclosures, each coupled in daisy-chain fashion in the network to the disk array switches of the previous enclosure.

If the system is fibre channel-arbitrated loop (FC-AL) architecture, when the system is initialized, either or both RAID adapters (collectively referred to as "adapter") performs a discovery operation using a "pseudo-loop" through the switches. During discovery, the addresses of all of the devices on the network are determined. The system then enters its normal switched mode. However, if a drive becomes faulty during normal system operations, it may repeatedly enter and exit the network, each time causing the adapter to enter the discovery mode again, resulting in system-wide disruption.

If diagnostics are performed on the suspected faulty drive, the system is further disrupted. While it is possible to isolate the suspected faulty drive by by-passing the ports through which it is coupled to the switches, effectively removing the drive from the network, the drive is then inaccessible for diagnostic operations to be performed on it.

Consequently, a need remains to be able to perform diagnostic operations on a drive without disrupting access to the rest of the disk array or to the network.

SUMMARY OF THE INVENTION

The present invention includes a storage system, a RAID adapter, disk array switches, sub-processors, and hard disk drives (HDDs). The system permits the isolation of a target HDD to allow diagnostics to be performed without impacting operation of the rest of the system. The status of HDDs is monitored for a variety of factors, such as unstable network behaviors, slow response or some other trigger event or process. Upon detection of such an event or process (also referred to herein as a "possible fault"), a private zone is established including the target HDD and one of the sub-processors, thereby isolating the target HDD. The sub-processor performs diagnostic operations, then transmits its results to the adapter. The target HDD is then fully isolated and the private zone is disassembled, allowing the sub-processor to rejoin the network.

DETAILED DESCRIPTION OF THE PREFERRED EMBODIMENT

Figure 1:
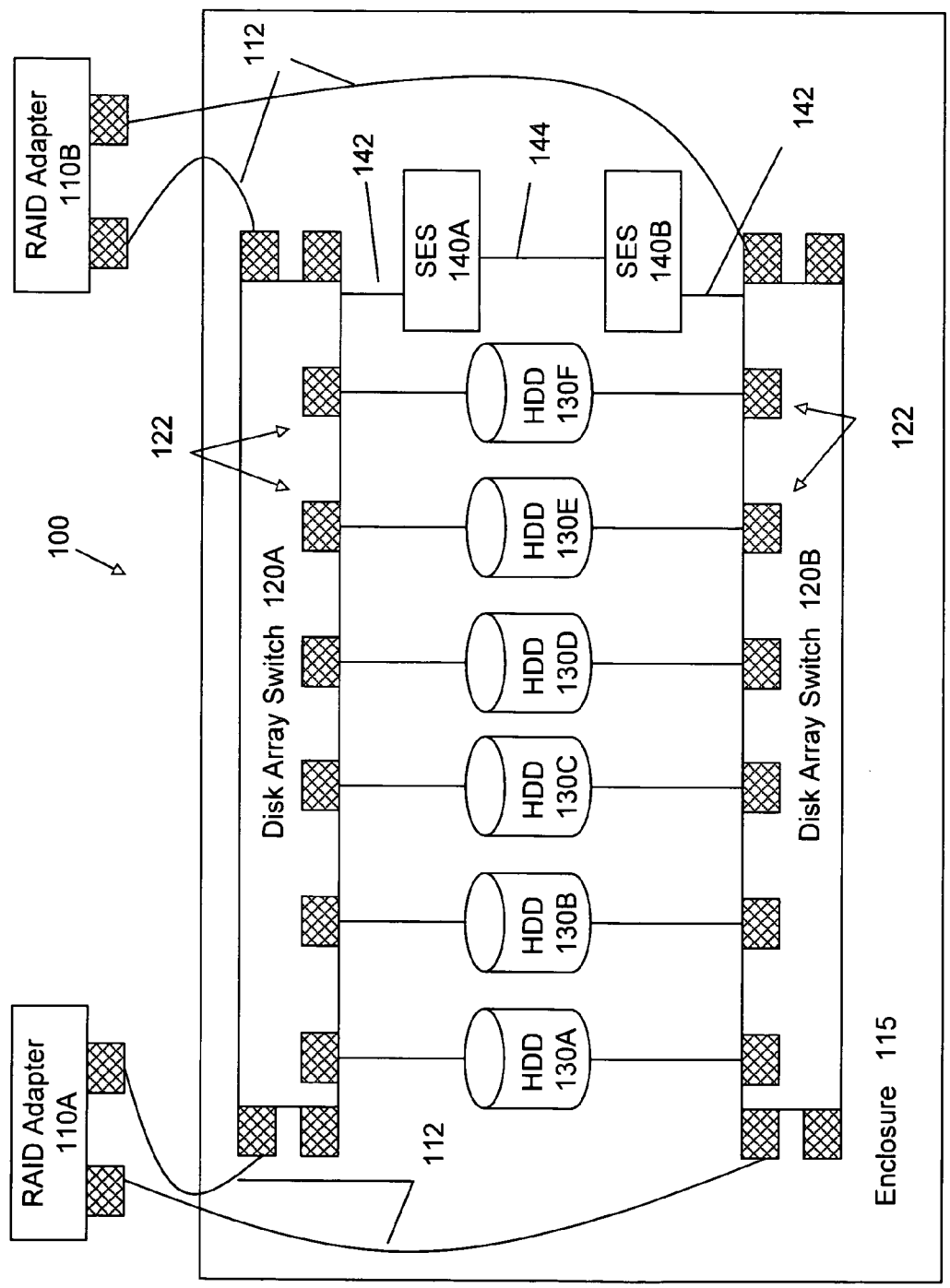
FIG. 1 is a block diagram of a RAID storage system in which the present invention may be implemented.

FIG. 1 is a block diagram of a RAID storage system 100 in which the present invention may be implemented. The system 100 includes a redundant pair of RAID adapters or controllers 110A, 110B (collectively referred to as 110) which are coupled to one or more servers. The system 100 further includes an enclosure 115 housing a pairs of redundant disk array switches 120A and 120B (collectively referred to as 120). The enclosure 115 also houses a group of hard disk drives (HDDs) 130A, 130B, 130C, 130D, 130E, 130F (collectively referred to as 130). Each HDD is coupled through ports 122 with both switches. The system 100 also includes a pair of redundant sub-processors or service processors 140A, 140B (and collectively referred to as 140), such as SCSI Enclosure Services (SES) processors, each coupled through a fabric or network 142 with one of the switches 120A, 120B. The sub-processors 140A, 140B are coupled to each other with a processor-to-processor link 144. In the system 100 illustrated, the service processors 140A, 140B are SCSI Enclosure Service (SES) processors which manage switch functions and the enclosure environment. The adapters 110 are coupled to the switches 120 through fabric or network links 112. The system 100 may include additional enclosures coupled in daisy-chain fashion to ports of the upstream enclosure. Thus, any communications between an adapter 110 and a switch or HDD in an enclosure passes through the switches of upstream enclosures.

The system 100 may be based on a fibre channel-arbitrated loop (FC-AL) architecture, a serial attached SCSI (SAS) architecture, or other architecture which includes dual-ported access to the HDD.

Figure 2:
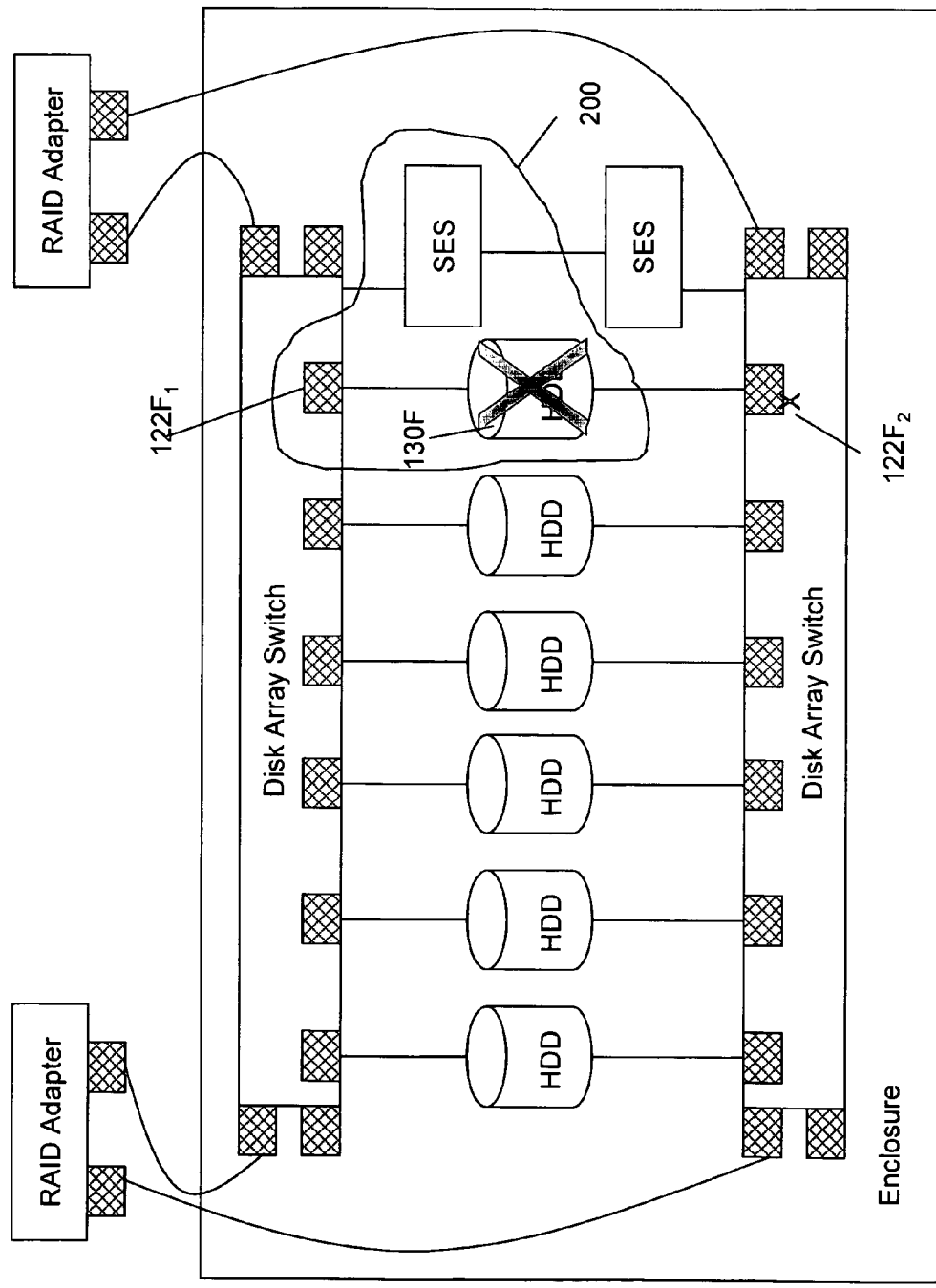
FIG. 2 is a block diagram of the RAID storage system illustrating the process of isolating and diagnosing a target drive.
Figure 3:
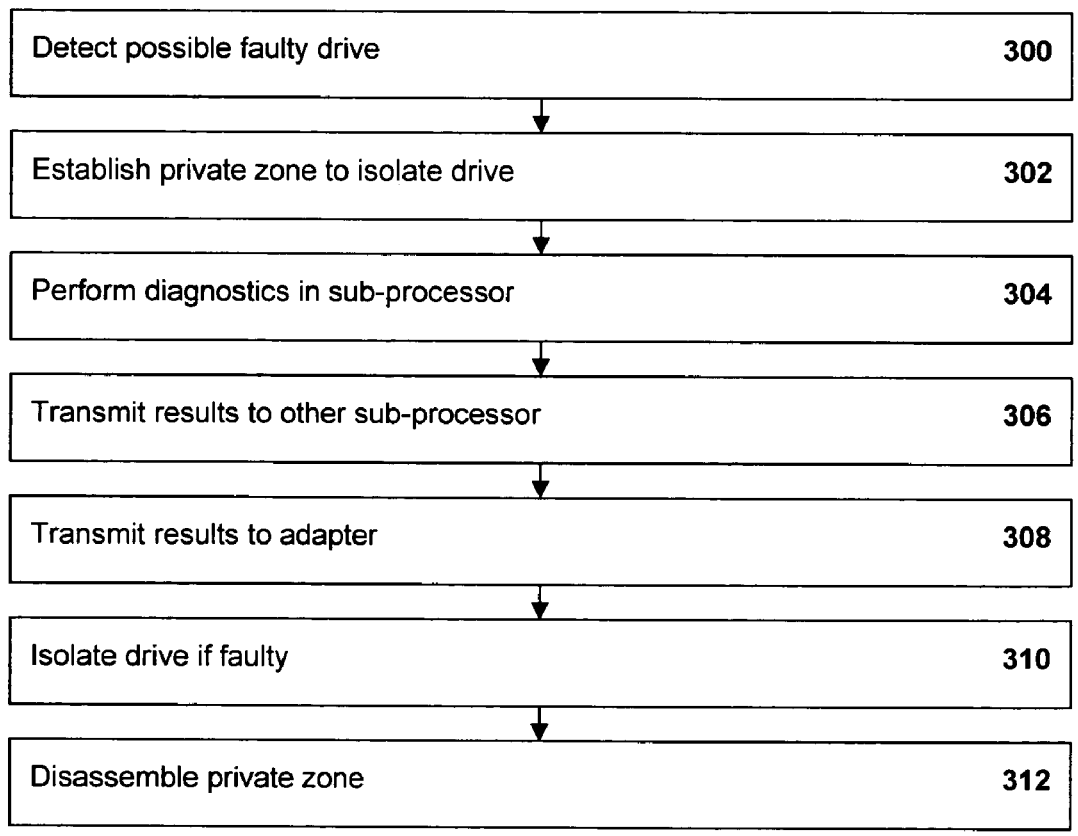
FIG. 3 is flowchart of a method of the present invention.

Referring to FIG. 2 and to the flowchart of FIG. 3, a possible fault has been detected in one of the HDDs 130F (step 300). Rather than perform the diagnostics in the adapter 110, the task is offloaded to a sub-processor 140. A "private zone" 200 is established by one of the switches (step 302), switch 120A in FIG. 2, including one of the sub-processors (140A), a target drive 130F and the port $122F_1$ through which the target drive 130F is coupled to the switch 120A. The other port $122F_2$ through which the target drive 130F is coupled to the other switch 120B is disabled or by-passed by the other switch 120B. The components within the private zone are thus isolated from the balance of the system 100. The sub-processor 140A is then able to perform diagnostics on the target drive 130F (step 304) without impacting the rest of the system 100.

Upon completion of the diagnostic operations, the sub-processor 140A communicates the results to the other sub-processor 140B over the processor-to-processor link 144 (step 306). The other sub-processor 140B then communicates the results through the switch 120B to the adapter 110 over the network 112 (step 308). Subsequently, if the target drive 130F is determined to be faulty, both ports 122F$_1$ and 122F$_2$ through which the drive 130F is coupled to the switches 120A, 120B, respectively, are disabled or by-passed to fully isolate the drive 130F (step 310) and the private zone is disassembled (step 312), allowing the sub-processor 140A to rejoin the full network.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for isolating and performing diagnostics on a hard disk drive in a redundant storage system or a method for deploying computing infrastructure comprising integrating computer readable code into a computing system for isolating and performing diagnostics on a hard disk drive in a redundant storage system.

What is claimed is:

1. A redundant storage system, comprising:
   first and second redundant disk array switches;
   a group of hard disk drives (HDDs), each coupled separately to the first and second switches through a pair of independent ports;
   first and second redundant sub-processors coupled to the first and second switches, respectively;
   an adapter separately interconnected with the first and second switches through a network;
   means for detecting a suspected faulty HDD;
   the first switch comprising means for bypassing the port through which the suspected faulty HDD is coupled;
   the second switch comprising means for establishing a private zone, comprising the second sub-processor and the suspected faulty HDD whereby the private zone is isolated from the network;
   the second sub-processor comprising:
      means for performing diagnostic operations on the suspected faulty HDD; and
      means for transmitting results of the diagnostic operations to the adapter through the first sub-processor.

2. The system of claim 1, wherein the second switch further comprises:
   means for bypassing the port through which the suspected faulty HDD is coupled, whereby the suspected faulty HDD is full isolated from the network; and
   means for disassembling the private zone, whereby the second sub-processor rejoins the network.

3. The system of claim 1, wherein the first and second sub-processors comprise SCSI Enclosure Services (SES) processors.

4. The system of claim 1, wherein the network comprises a network selected from a group comprising FC-AL, and SAS.

5. A method for isolating and performing diagnostics on a hard disk drive in a redundant storage system, the system having first and second redundant disk array switches, a group of hard disk drives (HDDs), each coupled separately to the first and second switches through a pair of independent ports, first and second redundant sub-processors coupled to the first and second switches, respectively, and an adapter separately interconnected with the first and second switches through an interconnecting network, the method comprising:
   detecting possible faults in a target HDD;
   using the first switch to bypass the port through which the suspected faulty HDD is coupled;
   using the second switch to establish a private zone, isolated from the network, comprising the target HDD and the second sub-processor;
   using the second sub-processor to perform diagnostics on the target HDD; and
   transmitting the results of the diagnostics to the adapter through the first sub-processor.

6. The method of claim 5, further comprising:
   bypassing the target HDD in both associated switches if the target HDD is determined to be faulty; and
   disassembling the private zone whereby the sub-processor in the private zone rejoins the network.

7. The method of claim 5, wherein the private zone is established by one of the pair of switches.

8. The method of claim 5, wherein the sub-processors comprise SCSI Enclosure Services (SES) processors.

9. The method of claim 5, wherein the network comprises a network selected from a group comprising FC-AL, and SAS.

10. A computer program product of a computer readable recordable-type medium usable with a programmable computer, the computer program product having computer-readable code embodied therein for isolating and performing diagnostics on a suspected faulty hard disk drive in a redundant storage system, the system having first and second redundant disk array switches, a group of hard disk drives (HDDs), each coupled separately to the first and second switches through a pair of independent ports, first and second redundant sub-processors coupled to the first and second switches, respectively, and an adapter separately interconnected with the first and second switches through an interconnecting network, the computer-readable code comprising instructions for:
   detecting possible faults in a target HDD;
   using the first switch to bypass the port through which the suspected faulty HOD is coupled;
   using the second switch to establish a private zone, isolated from the network, comprising the target HDD and the second sub-processor;
   using the second sub-processor to perform diagnostics on the target HDD; and
   transmitting the results of the diagnostics to the adapter through the first sub-processor.

11. The computer program product of claim 10, wherein the computer-readable code further comprises instructions for:

bypassing the target HDD in both associated switches if the target HDD is determined to be faulty; and disassembling the private zone whereby the sub-processor in the private zone rejoins the network.

12. The computer program product of claim 10, wherein the instructions for establishing a private zone comprise instructions for one of the pair of switches to establish the private zone.

13. The computer program product of claim 10, wherein the sub-processors comprise SCSI Enclosure Services (SES) processors.

14. The computer program product of claim 10, wherein the network comprises a network selected from a group comprising FC-AL and SAS.

15. A method for deploying computing infrastructure, comprising integrating computer readable code into a computing system, the system having first and second redundant disk array switches, a group of hard disk drives (HDDs), each coupled separately to the first and second switches through a pair of independent ports, first and second redundant sub-processors coupled to the first and second switches, respectively, and an adapter separately interconnected with the first and second switches through an interconnecting network, wherein the code, in combination with the computing system, is capable of performing the following:

detecting possible faults in a target HDD;

using the first switch to bypass the port through which the suspected faulty HDD is coupled;

using the second switch to establish a private zone, isolated from the network, comprising the target HDD and the second sub-processor;

using the second sub-processor to perform diagnostics on the target HDD; and transmitting the results of the diagnostics to the adapter through the first sub-processor.

16. The method of claim 15, wherein the code, in combination with the computer system is further capable of performing the following:

bypassing the target HDD in both associated switches if the target HDD is determined to be faulty; and disassembling the private zone whereby the sub-processor in the private zone rejoins the network.

17. The method of claim 15, wherein the code for establishing a private zone is capable of directing one of the pair of switches to establish the private zone.

18. The method of claim 15, wherein the sub-processors comprise SCSI Enclosure Services (SES) processors.

19. The method of claim 15, wherein the network comprises a network selected from a group comprising FC-AL and SAS.

* * * * *